United States Patent [19]

Hawryluk

[11] Patent Number: 4,472,324
[45] Date of Patent: Sep. 18, 1984

[54] GAS PURIFIER UNIT

[76] Inventor: John Hawryluk, 601 Middlesex Dr., Cinnaminson, N.J. 08077

[21] Appl. No.: 457,570

[22] Filed: Jan. 13, 1983

[51] Int. Cl.³ .............................................. B01D 47/02
[52] U.S. Cl. .............................. 261/79 A; 261/114 JP; 55/229; 55/237; 55/245
[58] Field of Search ................. 55/229, 235, 237, 240, 55/244, 245, 256; 261/79 A, 114 JP, 126

[56] References Cited

U.S. PATENT DOCUMENTS

| | | | |
|---|---|---|---|
| 1,878,467 | 9/1932 | Clarke | 261/79 A |
| 2,007,759 | 7/1935 | Harmon | 55/235 |
| 2,075,344 | 3/1937 | Hawley | 261/79 A |
| 2,756,976 | 2/1955 | Jalma | 261/79 A |
| 3,105,105 | 9/1963 | Kittel | 261/79 A |
| 3,332,214 | 7/1967 | Huppke | 55/248 |
| 3,524,302 | 8/1970 | Jalma | 261/79 A |
| 3,675,396 | 7/1972 | Hawryluk et al. | 55/235 |
| 3,807,143 | 4/1974 | Dunn | 261/79 A |

Primary Examiner—David L. Lacey
Attorney, Agent, or Firm—Shlesinger Arkwright Garvey & Fado

[57] ABSTRACT

A liquid contact type gas purifier unit in which gases to be treated are passed upwardly through a bath cleansing fluid to impart a circular and radially outward movement along a central perforate support plate, the periphery of which has a circular rim with an adjacent collecting and reciprocating trough to provide for an even outward flow of cleansing fluid and stability of flow of the interacting fluid and gas streams and wider latitude of operable gas and pressure and flows.

9 Claims, 4 Drawing Figures

GAS PURIFIER UNIT

BACKGROUND OF INVENTION

This invention relates to a gas purifier unit, and particularly to a gas-liquid contact type device.

Specifically, it is an improvement over the gas purifier unit described in my previous U.S. Pat. No. 3,675,396, issued Jul. 11, 1972.

That unit, although working satisfactorily to remove impurities from gases, encountered limitations in operating characteristics. In particular, the body of cleansing fluid was very sensitive to changes in either gas supply pressure to the unit or to amount of liquid supplied to the cleansing fluid support plate. There were also limitations with respect to efficient operation for larger sized units.

SUMMARY OF INVENTION

Accordingly, it is a principal object of this invention to provide a gas purifier unit overcoming the limitations of the previous design.

It is also a feature of this invention to provide a more effective and versatile gas purifier unit than previous units.

It is a still further feature of this invention to provide a liquid gas contact gas purifier unit which has greater capacity than heretofore possible.

It is a still further feature of this invention to permit operation of a gas-liquid contact unit under a wider range of acceptable gas pressure and cleansing fluid conditions.

It is a still further feature of this invention to provide a more efficient gas purifier unit in which fluid surges are eliminated and has improved gas-liquid contact characteristics.

A still further feature of this invention is to obtain more effective utilization of the cleansing fluid-gas interaction with a more even fluid distribution of the cleansing fluid bath through which the gas to be purified travels.

These and further features of this invention will become apparent from the following description of the drawings.

DESCRIPTION OF THE INVENTION

Figure 1:
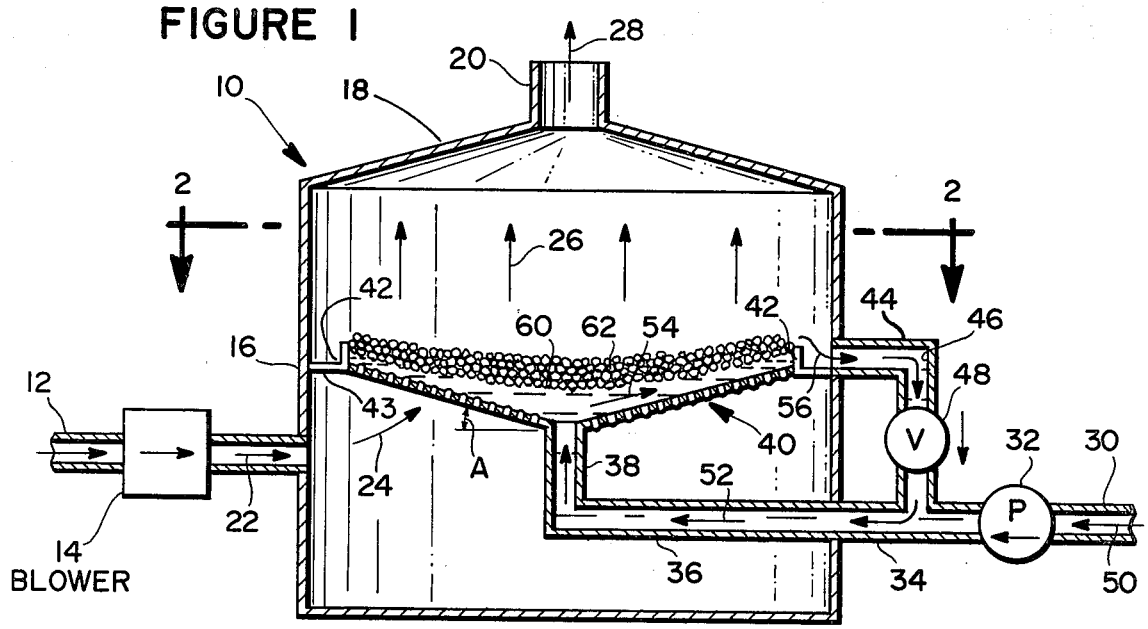
FIG. 1 is a cross-sectional view of the gas purifier unit disclosing the paths of travel of both the gas and fluid mediums.

Referring to the drawings, the gas purifier unit generally indicated at 10 has a gas inlet 12 through which gas is supplied under light pressure by blower 14. The closed cylindrical housing 16 has an inverted conical top 18 with a central gas outlet 20.

The inlet gas stream containing the impurities to be removed by the gas purifier unit 10 passes through the gas inlet line 12 and blower 14 in a stream 22 which passes into the lower section of the housing. It then passes up and through the cleansing fluid bath assembly which removes impuruties. The purified gas stream 26 then passes vertically up through the upper section of the cylindrical housing, and out the top thereof at the outlet discharge 20 in a converged outlet stream 28.

The cleansing fluid inlet line 30 is connected to the lower section of housing 16 through pump 32 by the external inlet line 34 which is connected directly through the lower section of the gas purifier housing. The internal portion 36 of the cleansing fluid supply line is connected to the funnel-shaped cleansing fluid support plate 40 by the central cleansing fluid supply line 38.

This supply of fluid provides a depth of water from approximately one-half to one and one-half inches along the top surface of the perforate plate. It has a small conical angle A of about 15° with respect to the horizontal. Along the periphery of the perforate cleansing liquid support plate is a vertical continuous flange 42 defining a low inner wall of a cleansing fluid overflow receiving trough 43. It is about one and one-half inches higher for a two-foot diameter perforate plate unit. Several outlet lines 44, provide a cleansing fluid drain outlet to a discharge line 46 containing a discharge valve 48. The plate assembly 40 is preferably from two to four feet in diameter, and is constructed of stainless steel.

Cleansing fluid is supplied along line 50 and through pump 32. Ordinarily, the cleansing fluid will recirculate in a closed loop through the valve 48 and lines 34 and 36, with some supply pressure from the pump. However, when it is desired to change the cleansing fluid, the valve setting is changed to connect with a discharge line, not shown.

The bath of cleansing fluid 60 is supported on the plate 40 and has a depth of from one and one-half inches, approximately, to two inches. The gases passing up through the perforated support are under pressure slightly greater than the water depth in inches which impart to the bath a circular motion and create a foam or bubble froth 62 on top of the bath.

Figure 2:
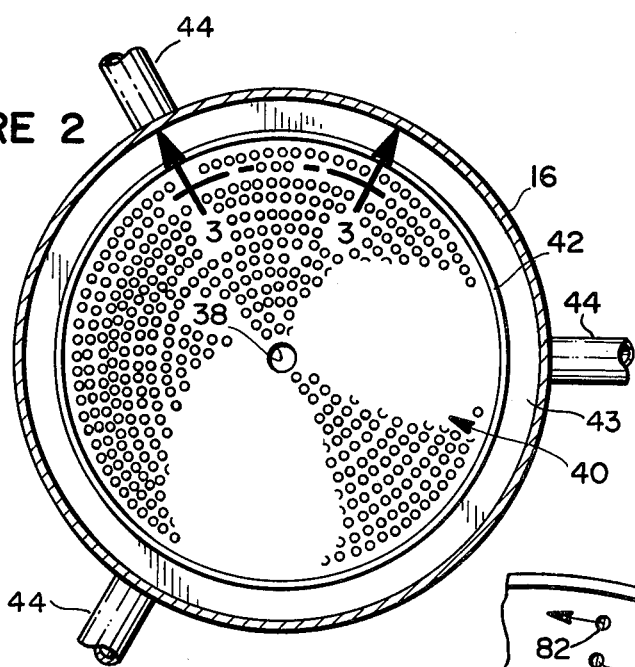
FIG. 2 is a horizontal-sectional view of the gas purifier unit of FIG. 1 showing the perforated plate and peripheral trough.

With respect to the plate structure itself, FIS. 2, 3, and 4 are of particular interest. With reference to FIG. 2, it will be seen that the support plates have very closely shaped openings. These openings are approximately three-eighths of an inch in diameter and are directionally oriented to provide a pattern of gas jets to impart a circular radially outward flow of the cleansing fluid bath along the top of the perforated support plate.

Figure 3:
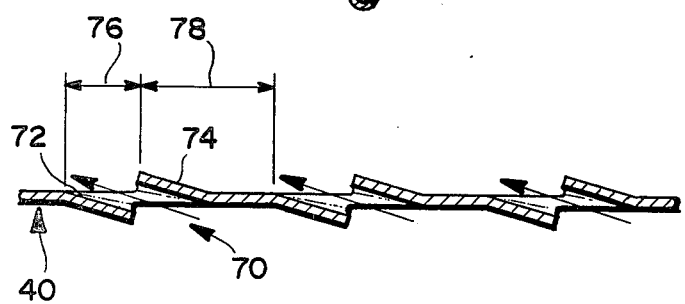
FIG. 3 is a section along line 3—3 of FIG. 2 disclosing the construction of the directional openings of the support plate.

FIG. 3 shows the sectional construction of the directional openings 70 which have a lower and upper guide section respectively. The dimension 76 of the opening is approximately three-eighths of an inch, and the spacing 78 between adjacent openings is approximately double that value.

Figure 4:
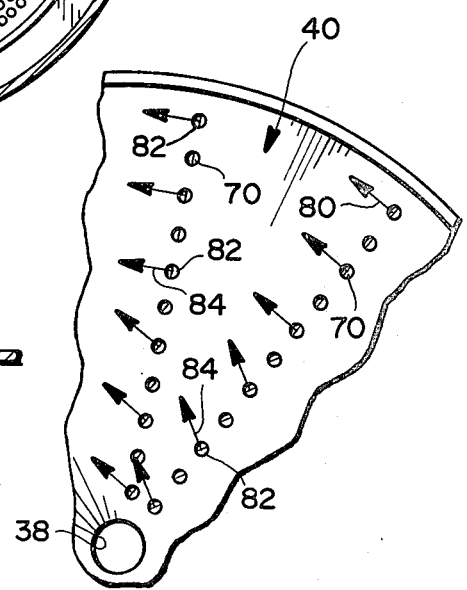
FIG. 4 is a partial top view of the cleansing fluid support plate disclosing the direction of the gases as they emerge from the directional openings.

FIG. 4 discloses an important aspect of the directional orientation of the openings also. Note that the outer peripheral streams of gases 80 issuing from the holes 70, such as the hole 82, have a direction which is perpendicular to the radial line on which they lie. The gases issuing from the openings 70 closer in to the center of the perforate plate are shown by arrows to be in a direction slightly radially outward, rather than tengential to the circular flow of gases. The directional openings that have the radially outward orientation are those located approximately up to one-third to one-half of the distance outward from the actual center of the plate.

OPERATION

The gas purifier unit acts as a purifier of gas streams that are supplied through inlet line 12 and are introduced to the lower section of the housing under pressure by blower 14. The impure gases containing either solid particles or reactive gaseous elements are passed upwardly through the funnel-shaped plate assembly 40 and impart a circular rotational movement to the cleansing fluid bath 60 as the gas passes through it in a plurality of directional gas jets. The gas jets are of sufficient magnitude to impart a rotational movement to the bath as well as to give it a tengentially outward movement so that it flows out toward and over the circular peripheral flange 42 to the receiving trough 44.

The fluid then is recirculated through lines 36 and 46 and valve 48 until such time as the fluid bath is to be changed or supplemented by additional cleansing fluid 50 through line 30. Pump 32, located in line 34, is used to either assist recirculation of the fluid, or to supply new cleansing fluid. The valve 48 can also be used to dump spent cleansing fluid through a line, not shown.

The shallow angle of the perforate plate with respect to the horizontal, which is preferably 17°, permits the fluid to flow outwardly and over the peripheral flange 42 in an even circular motion.

It has been found that the arrangement shown will produce an even flow of fluid across the plate and one that is free of surges or gas pressure. This was one of the drawbacks of the earlier device when fluid was circulated toward the center drain of the perforated plate in the previous gas purifier of U.S. Pat. No. 3,675,396.

The gas flow through the perforate plate is on a larger scale than the previous design, and permits the bath to be more smoothly moved in a circular fashion without need for tangential input nozzle arrangements, as indicated in the older design.

The radially outward flow and the circular trough arrangement eliminate the surge and provide a greater ability to vary limits of gas pressure input and fluid volume circulation in a more even efficient fashion than the previous design. The overflow of the cleansing fluid over the peripheral wall contributes substantially to governing the heighth of the bath and thereby evens distribution of fluid of the bath to eliminate the surge and bunching encountered with the gas purifier unit of U.S. Pat. No. 3,675,396.

The change in directional relationship between the radially close-in and peripheral issuing gas streams through the perforate plate, as shown in FIG. 4, also contributes to the stabilization of the gas cleansing bath. The initial flow from the supply conduit moves radially outward, while the peripheral jets impart a circular tangential motion to the radially outward moving cleansing fluid, thereby reducing wave reflection and turbulence at the peripheral wall.

While this invention has been described, it will be understood that it is capable of further modification, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:
1. A gas purifier unit, comprising:
   (a) a closed cylindrical housing having upper and lower sections,
   (b) a gas inlet connected to the lower section for supplying a gas stream containing impurities under pressure to the housing,
   (c) an exhaust gas outlet connected to the upper section for removing a stream of cleansed gas,
   (d) a perforate funnel-shaped cleansing fluid bath support plate assembly disposed across the housing central section which delineates the upper and lower sections and having an upper conical portion with a fluid inlet opening at its apex and lowermost point,
   (e) a cleansing fluid supply line passing from below and adjacent the periphery of the support plate assembly to the fluid inlet opening to supply cleansing fluid to the upper surface of the plate assembly to form a cleansing bath,
   (f) an upwardly extending continuous circular flange connected along the outer periphery of the bath support plate assembly for containing the cleansing fluid at a desired depth and spaced a small distance from the interior surface of the housing,
   (g) a fluid receiving trough section, the inner wall of which is the continuous circular flange and having an outlet in flow communication with the fluid supply line for supplying recycled cleansing fluid leaving the trough section to the cleansing fluid supply line,
   (h) the conical portion of the bath support plate assembly having a plurality of closely spaced directional gas supply openings disposed throughout its surface for supplying gases from the lower section to the path through the bath under pressure in a plurality of directional streams to impart a circular outward movement of the entire body of the cleansing fluid, and
   (i) an outlet line connecting the trough section to the fluid supply line.
2. The gas purifier unit as set forth in claim 1, wherein:
   (a) the continuous circular flange is approximately one to two inches in heighth, and
   (b) the diameter of the cleansing fluid bath support plate assembly is between two to four feet.
3. The gas purifier unit as set forth in claim 2, wherein:
   (a) the conical angle of the perforate plate assembly is approximately 15°.
4. The gas purifier unit as set forth in claim 1, wherein:
   (a) a blower unit is connected to the gas inlet for supplying gases at a pressure in inches of water which is slightly greater than the depth of the water on the fluid bath support plate assembly.
5. The gas purifier unit as set forth in claim 1, wherein:
   (a) the entire assembly is constructed of stainless steel.
6. The gas purifier unit as set forth in claim 1, wherein:
   (a) the angle of deflection of the directional gas supply openings near the housing wall is substantially tangential to the radial line on which they are disposed, and,

(b) the directional gas supply openings closer to the center of the assembly are inclined in a more radially outward direction.

7. The gas purifier unit as set forth in claim 1, wherein:
   (a) the fluid receiving trough section is spaced relatively close to the inner wall of the housing, and has a plurality of said outlets in flow communication with the supply conduit.

8. The gas purifier unit as set forth in claim 1, wherein:
   (a) the outlet line is connected between the fluid receiving trough and the fluid supply line, and
   (b) a valve is connected in the outlet line for permitting either recirculation of the cleansing fluid or draining of the same.

9. The gas purifier unit as set forth in claim 1, wherein:
   (a) the continuous circular flange is approximately one to two inches in heighth,
   (b) the diameter of the cleansing fluid bath support plate assembly is between two to four feet,
   (c) the conical angle of the perforate plate assembly is approximately 15°, and
   (d) a blower unit is connected to the gas inlet for supplying gases at a pressure in inches of water which is slightly greater than the depth of the water on the fluid bath support plate assembly.

* * * * *